Patented Aug. 9, 1949

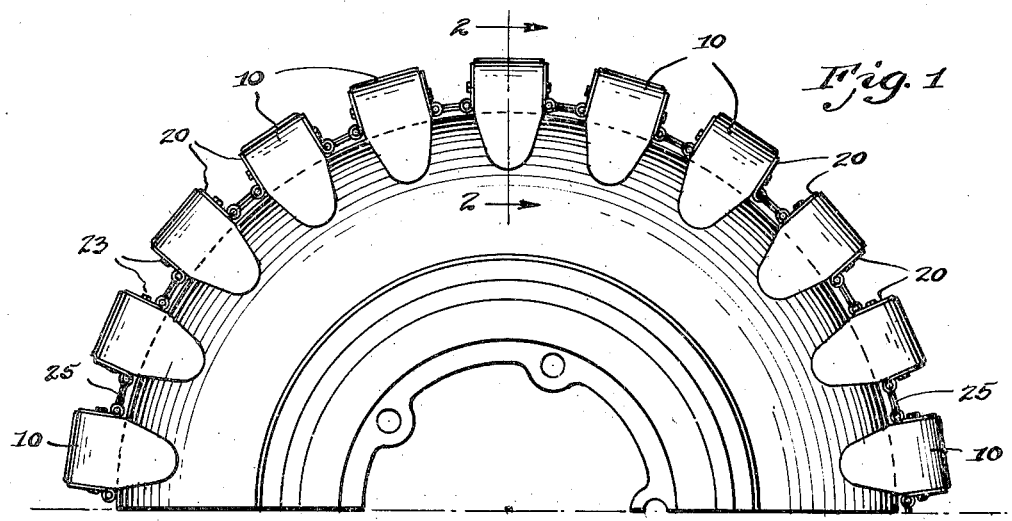
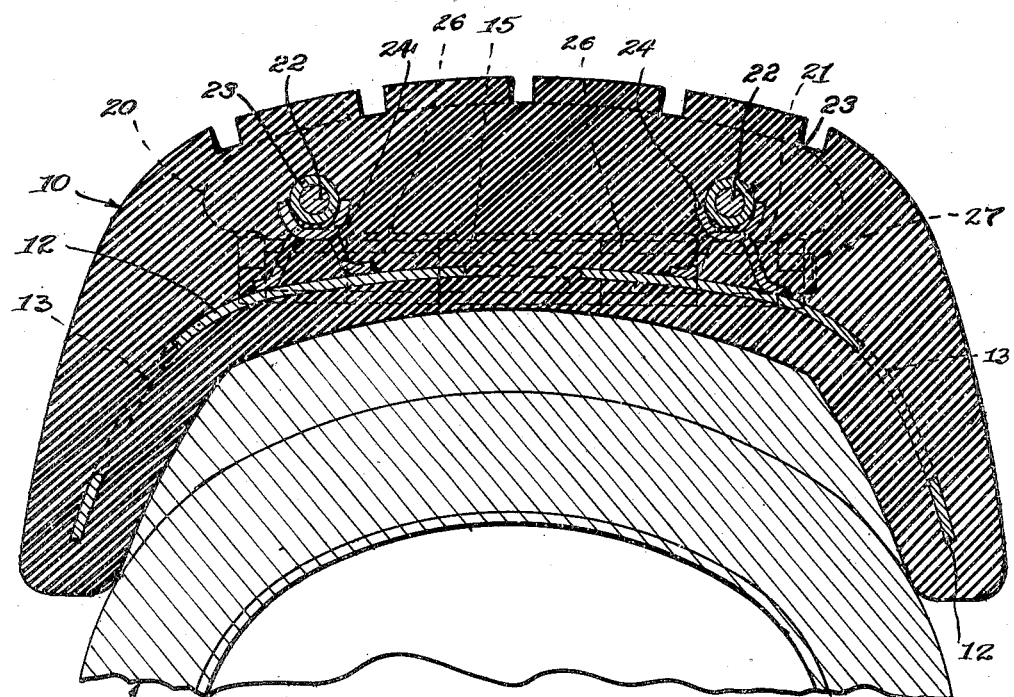

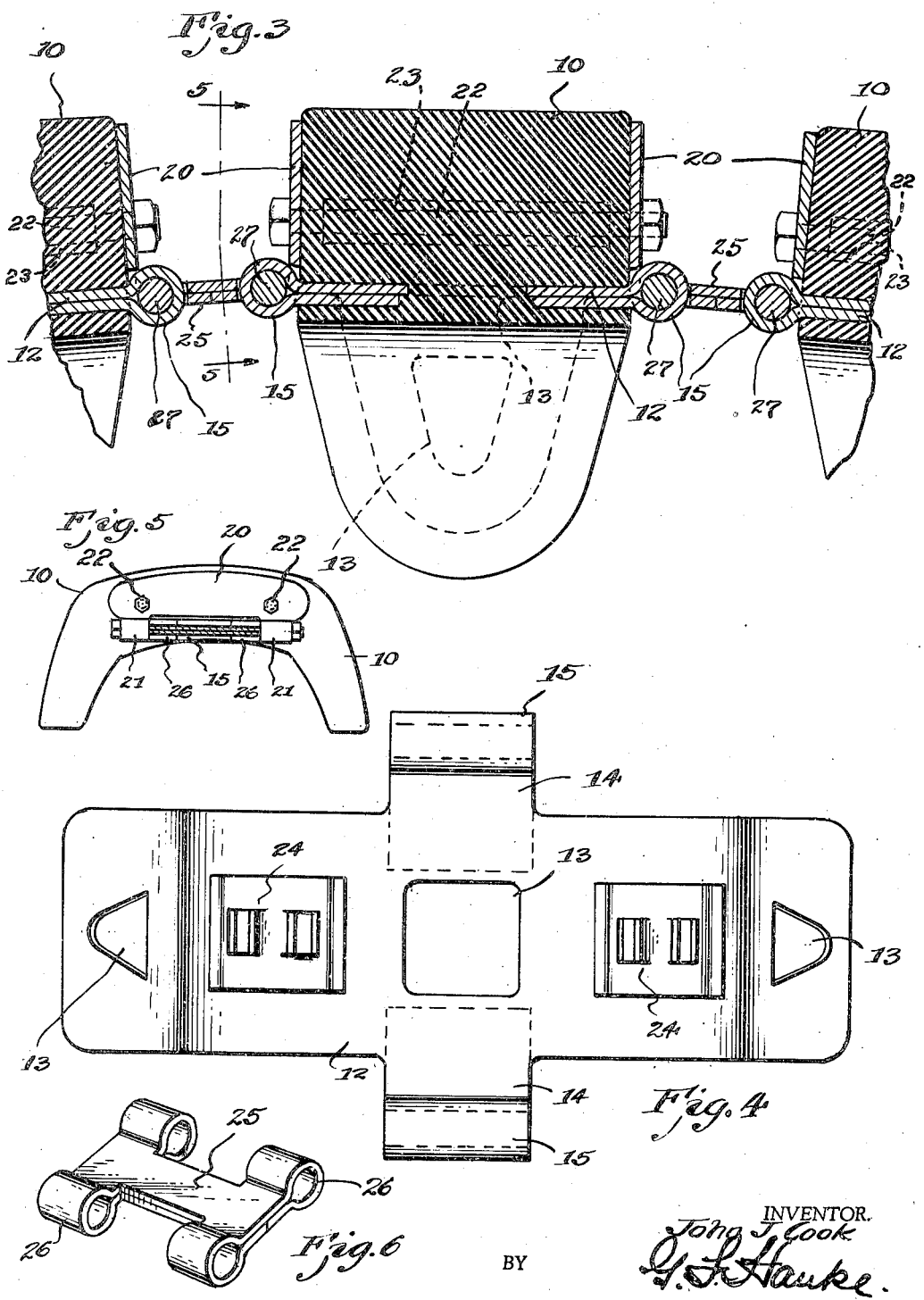

2,478,371

UNITED STATES PATENT OFFICE 2,478,371

ANTISKID DEVICE FOR TIRES

John J. Cook, Detroit, Mich., assignor to John J. Cook Manufacturing Corporation, Detroit, Mich., a corporation of Michigan Application April 16, 1945, Serial No. 588,587

1 Claim. (Cl. 152—179)

My invention relates to an anti-skid device for rubber tired vehicles, used generally to extricate these vehicles from mud, deep snow and to prevent skidding upon ice covered surfaces.

Chains and hooks are not entirely satisfactory since they wear rapidly and tend to cause uncomfortable riding, and also continuous use of chains and other similar devices is injurious to rubber tires.

An object of my present invention is to provide an improved anti-skid device which employs a plurality of annularly spaced resilient rubber blocks, all of which are hinged together by a continuous flexing annular metal rim assembly, which carries said rubber blocks or sections, said rubber blocks or sections being readily removed when worn to facilitate maintenance of this equipment. Furthermore the metal rim assembly is kept away from the rubber tire to avoid scuffing thereof.

For a more detailed understanding of my invention reference may be had to the accompanying drawings illustrating a preferred embodiment of the invention and in which:

Fig. 1 is a fragmentary side elevation of a vehicle wheel showing the anti-skid device secured thereon, Fig. 2 is a transverse sectional view taken substantially on the line 2—2 of Fig. 1.

Fig. 3 is an enlarged side elevational view of the anti-skid device,

Fig. 4 is a plan view of the formed plate which carries the rubber block or section, Fig. 5 is a side view of the block assembly taken substantially on the line 5—5 of Fig. 3 and on a reduced scale, and Fig. 6 is a perspective view of the spacer member.

My device comprises broadly a plurality of rubber blocks circumferentially spaced around the vehicle tire, and all hinged together. The rubber blocks or sections 10 are substantially U-shaped and are constructed to straddle the tire tread, as is clearly illustrated in Figs. 1 and 2. The inner surface of each rubber block 10 is formed to rest snugly against the surface of the tread of the tire 11.

These rubber blocks or sections are all hinged together, said hinge means comprising an assembly of cooperating sheet metal stampings. A formed plate 12 is molded in each of said blocks, same being substantially U-shaped and having holes or openings 13 through which the rubber projects to key same to the plate. Said plate is provided with side extensions 14 which terminate in hinge eyelets 15 projecting laterally from the side walls of the blocks. Side plates 20 are secured flush to side surfaces or walls of said rubber blocks, and also terminate in spaced hinge eyelets 21 which are axially aligned with the hinge eyelets of said plate 11. Intermediate spacer plates 25 having hinge eyelets 26 on opposite sides are located and aligned with the plates 12 and 20, and a bolt 27 serves as a common pintle to hinge all said plates together. The side plates 20 are secured to said block by bolts 22 extending through said rubber block, said bolts 22 supported in sleeves 23 molded internally of said block and supported by brackets 24 carried by the plate 12.

It will thus be recognized that the continuous metal flexing rim structure extends circumferentially around the vehicle tire and is of sufficient strength to carry all traction loads, and allows for radial flexing to permit same to normally flatten out under all loads and to thus provide for maximum contact with the road surface at all times. It will also be noted that the continuous metal rim structure is spaced from the tread of the rubber tire to avoid scuffing of the tire, all contact of the anti-skid device with said tire being had through said rubber blocks or sections 10.

Although I have illustrated but one form of my invention and have described in detail but a single application thereof, it will be apparent to those skilled in the art to which my invention pertains, that various modifications and changes may be made therein without departing from the spirit of my invention or from the scope of the appended claim.

I claim:

In a device of the character described, a plurality of spaced U-shaped sections arranged radially around a tire, hinge means connecting said sections comprising a formed plate molded internally of said section and having an extension laterally projecting from each side of said section and terminating in hinge eyelets, side plates secured to the sides of each section and having hinge eyelets along their inner edges aligned with the hinge eyelets of said formed plate extensions, and an intermediate spacer member having hinge eyelets constructed for alignment with said other hinge eyelets, and a bolt assembling all said hinge eyelets to hinge said sections together, said formed plate perforations through which said section projects to key same to said plate, and carrying means supporting said side plate securing means.

JOHN J. COOK.

REFERENCES CITED

The following references are of record in the file of this patent:

UNITED STATES PATENTS

| Number | Name | Date |
| --- | --- | --- |
| 1,292,519 | Rosenberg | Jan. 28, 1919 |
| 2,294,772 | Cook | Sept. 1, 1942 |